July 22, 1969   F. L. ZEISLER   3,457,561
AUTO LAMP FAILURE WARNING CIRCUIT
Filed May 2, 1966
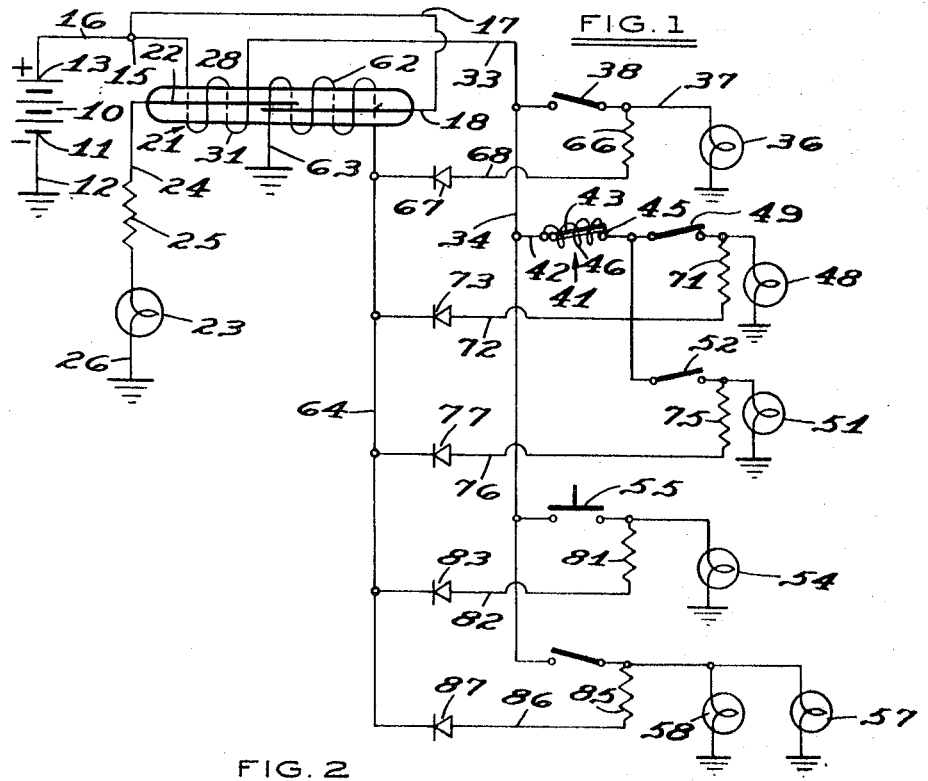
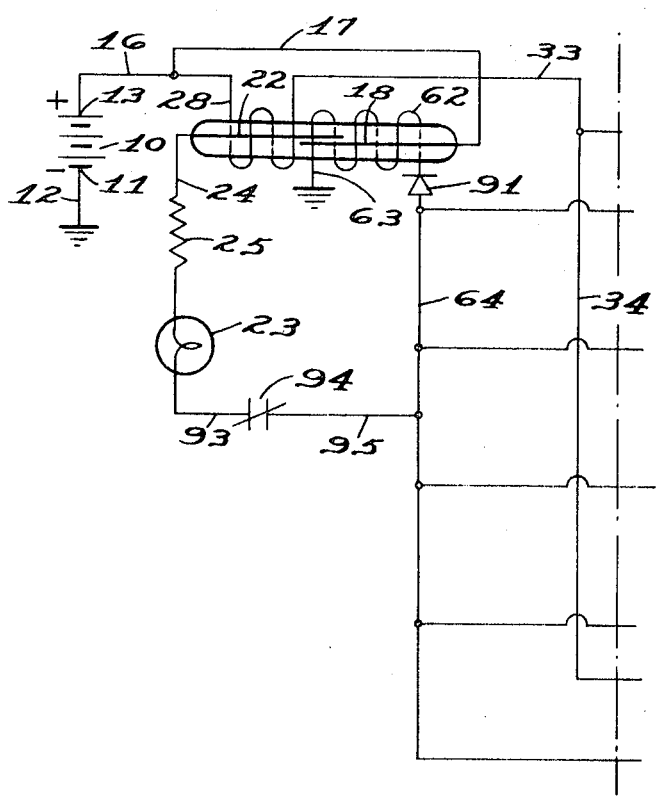
INVENTOR
FREDERIC L. ZEISLER
BY
John R. Faulkner
Keith L. Zerschling
ATTORNEYS

United States Patent Office 3,457,561
Patented July 22, 1969

3,457,561
AUTO LAMP FAILURE WARNING CIRCUIT
Frederic L. Zeisler, Livonia, Mich., assignor to Ford
Motor Company, Dearborn, Mich., a corporation
of Delaware
Filed May 2, 1966, Ser. No. 546,743
Int. Cl. B60q *1/52;* G08b *21/00*
U.S. Cl. 340—251                                                        4 Claims

ABSTRACT OF THE DISCLOSURE

A warning lamp is connected in series with a reed relay that is surrounded by two windings producing magnetic forces in opposite directions. The lamp being monitored is connected in series with one winding and in parallel with the other winding. During normal operation current in the series winding holds the relay contacts open; when the lamp being monitored fails, the magnetomotive force developed by current in the second winding overcomes the force developed by the first winding and closes the relay contacts to light the warning lamp.

---

This invention relates to a warning lamp circuit for indicating the malfunction or non-operation of any one of a plurality of circuits, and more particularly to a warning lamp circuit for an automotive vehicle that will monitor and indicate the malfunction or non-operation of any one of a number of lamp circuits in an automotive vehicle.

The invention provides a warning lamp that will be energized when any one of a number of circuits to be monitored malfunctions or becomes non-operative. For example, in an automotive vehicle there are large numbers of lamp circuits that are employed to energize lamps that are located on the exterior of the vehicle, where the vehicle operator has no way of knowing whether the exterior lamps are actually operating and have been energized when he throws a switch to operate these individual circuits. In the modern day automotive vehicle these lamps include the head lamps, the tail lamps, a stop lamp that may be incorporated into a tail lamp and that operates also when the brake pedal is depressed. The lamps may also include turn signal lamps that are intermittently flashed by means of a thermostatic switch when the driver of the vehicle throws a turn signal lamp switch by means of a turn signal lever to indicate either a left or a right-hand turn.

It is desirable both from an economic and a functional point of view to provide a single warning lamp that will be energized when any one of these circuits is inoperative or is malfunctioning so that the driver will have an indication that the filaments of the lamps are either burned out or a circuit to them is open circuited when he throws a switch to energize them. The present invention provides a novel and inexpensive means for providing such an indication from a single warning lamp. When this lamp is turned on the vehicle operator may then examine the exterior of the vehicle with the various switches energized to determine which of the particular lamps remains unenergized when he throws the switch to energize that particular lamp. Corrective action may then be taken and the burned out lamp may either then be replaced or the circuit leading to it, which has been open-circuited, may be repaired.

In the preferred embodiment of the invention, a reed relay is provided having a pair of normally open reeds that are connected in series with a source of electrical energy and the warning lamp to be energized when one of the circuits to be monitored is open-circuited. A first winding or coil is wound about the reeds and is positioned in series with the source of electrical energy and a lead to which each of the electrical circuits to be monitored is connected. These circuits are connected to this lead, as previously stated, so that each of them are connected in parallel with one another and each are in series with the first winding or coil. A circuit from each of the circuits to be monitored that is in parallel with the lamp whose operation is to be monitored is connected back to the other terminal of the source of electrical energy through a second winding or coil placed around the reeds. The second coil or winding is wound to develop a magnetomotive force opposite to the magnetomotive force developed by the first coil or winding. The number of turns in the second coil is substantially greater than the number of turns of the first coil since the parallel circuits connected to the second coil have sufficient resistance so that the current flow through the second coil when all of the circuits are operating is substantially less than the current through the first coil.

Thus, when all of the circuits are properly operating, whether this be one circuit or a great number of circuits operating simultaneously, the magnetomotive force developed in the first coil or winding is substantially equal to the magnetomotive force developed in the second winding, or stated another way, the magnetomotive forces are so balanced that the net or differential magnetomotive force is insufficient to close the reeds. When any one of the circuits becomes open circuited it causes a greater current flow through the circuit connected in parallel with it and hence causes a greater current flow through the second winding or coil. The circuit elements are selected so that this change in magnetomotive force is sufficient to close the reeds and to energize the warning lamp.

Rather than returning the lamp directly to the other terminal of the source of electrical energy, the lamp may be returned to this terminal through the second winding so that when the reed switch is energized by increased current flow through the second winding, the lamp will be energized continuously despite the fact that certain of the circuits to be monitored are intermittent in their operation, for example, the brake lamp circuit or the turn signal lamp circuit.

An object of the present invention is the provision of a warning lamp indicator for monitoring a plurality of electrical circuits that will indicate when any one of them is malfunctioning or is open-circuited.

A further object of the invention is the provision of a monitoring circuit for a plurality of electrical circuits which employs a single warning lamp that will be energized when any one of the circuits to be monitored is open-circuited or malfunctions.

Still another object of the invention is the provision in an automotive vehicle of a single warning lamp that will be energized and will inform the vehicle operator when any one of a number of lamps located on the exterior of the vehicle fails to operate or to be energized when the vehicle operator actuates the actuating switch for each of these individual circuits.

Still another object of the invention is the provision in an automotive vehicle of a single warning lamp that will indicate when any one of a plurality of vehicle lamps located on the exterior of the vehicle fails to be energized when a switch for energizing that particular circuit is energized even though these circuits are energized from a source of electrical energy through their respective actuating switches individually or simultaneously.

Other objects and attendant advantages of the present invention will become more readily apparent as the specification is considered in connection with the attached drawings in which:

FIGURE 1 is a circuit diagram of one embodiment of the invention; and

FIGURE 2 is a partial circuit diagram of another embodiment of the invention.

Referring now to the drawings in which like reference numerals designate like parts throughout the several views thereof, there is shown in FIGURE 1 a circuit diagram of the present invention in which a source of electrical energy 10 has one terminal, for example, the negative terminal 11 connected to ground through a lead 12. The other terminal of the source of electrical energy 10, for example, the positive terminal 13 is connected to a junction 15 through a lead 16. The junction in turn is connected through a lead 17 to one reed 18 of a reed relay or switch 21. The other reed 22 of the reed switch 21 is connected to one terminal of a warning lamp 23 through a lead 24 and a resistor 25. The other terminal of the warning lamp 23 is connected to ground and hence back to the negative terminal 11 of the source of electrical energy 10 through a lead 26.

The junction 15 is also connected through a lead 28 to one terminal of a first winding 31 that is wound about the reed switch 21 and the two reeds 18 and 22 so that it supplies a magnetomotive force to these reeds. The other terminal of the winding 31 is connected through lead 33 with another lead 34.

A plurality of circuits whose operation is to be monitored are connected in parallel with each other by connection to the lead 34. For example, in an automotive vehicle a tail lamp 36 is connected to lead 34 through a lead 37 and a tail lamp switch 38, that is operated by the automotive vehicle operator. A turn signal flashing switch 41 is connected to the lead 34 through a lead 42. This turn signal flashing switch may be of the standard type which includes a bimetal 43 connected to the lead 42 that is normally in contact with contact 45. A heater coil 46 is also connected to the lead 42 and to the end of the bimetal adjacent the contact 45. The contact 45 is connected in series with one of the turn signal indicating lamps 48 through a turn signal indicating switch 49 of the conventional type mounted in the steering column of the vehicle and adapted to be operated by the turn signal lever. The other turn signal lamp 51 is also connected to the contact 45 through the other turn signal switch 52 adapted to be operated by the turn signal lever when it is rotated in the other direction. Thus, the lamps 48 and 51 are connected in parallel with each other by this connection to the contact 45 so that either one or the other of the turn signal lamps 48 or 51 is connected to the turn signal flashing switch 41 when either of the turn signal switches 49 or 52 respectively is operated by the turn signal lever.

A stop lamp 54 is also connected to the lead 34 through a push button switch 55 that is operated by the hydraulic fluid in the brake system when the brake pedal of the system is depressed. The head lamps of the vehicle, designated by the numerals 57 and 58, are also connected to the lead 34 through the head lamp switch 61.

It is, of course, apparent that rather than providing separate tail lamps, stop lamps and turn signal lamps, that these could be, as is conventional in automotive vehicles, single lamps mounted on either side of the vehicle with dual filaments provided so that the various lighting functions may be accomplished by means of the two lamps, mounted on either side of the vehicle.

The reed switch 21 is also provided with a second coil or winding 62 that has one terminal connected to ground through a lead 63 so that this terminal is connected to the terminal 11 of the source of electrical energy 10 through this ground connection. The other terminal of the winding 62 is connected to a lead 64 and circuits in parallel with each of the lamp circuits to be monitored are connected to each of the lamps and to the lead 64 and hence the second winding or coil 62 through resistors and diodes, as shown in the drawing.

One terminal of the lamp 36 is connected to lead 64 through resistor 66, lead 68 and diode 67. Similarly, one terminal of the turn signal lamp 48 is connected through resistor 71, lead 72 and diode 73 to the lead 64, and one terminal of the other turn signal lamp 51 is connected to the lead 64 through resistor 75, lead 76 and diode 77. Also, one terminal of the stop lamp 54 is connected to the lead 64 through resistor 81, lead 82 and diode 83. The common terminals of the head lamps 57 and 58 that are connected to the switch 61 are also connected to the lead 64 through resistor 85, lead 86 and diode 87.

In the operation of the embodiment of the invention shown in FIGURE 1, the reeds 22 and 18 of the reed relay or switch 21 will normally be in an open position so that the warning lamp 23 is unenergized. Should a switch be actuated to operate one of the lamps or circuits whose operation is to be monitored, for example, should switch 38 of the tail lamp 36 be actuated, the tail lamp 36 will be energized from the positive terminal 13 of the source of electrical energy 10 through the junction 15, the lead 28, the winding 31, the lead 34, switch 38 and lead 37 thereby providing a current flow through the winding 31 to produce a magnetomotive force in one direction.

Current will also flow from the lead 37 or one terminal of the tail lamp 36 through resistor 66, lead 68, diode 67, lead 64, one terminal of the winding 62 of the reed switch 21 and back to the negative terminal 11 of the source of electrical energy 10 through the lead 63 and the ground connection connected to this lead. As previously explained, the winding 31 and the winding 62 are wound so that the current flowing through them produce magnetomotive forces in opposite directions thereby keeping the reeds 22 and 18 in the open positions as long as current flows through the tail lamp 36 to energize this lamp. Should the tail lamp 36 be burned out, however, so that its filament is open-circuited, all of the current flowing through the winding 31 of the reed switch will be returned to ground and hence the negative terminal 11 of the source of electrical energy 10 through the resistor 66, lead 68, diode 67, lead 64 and winding 62 of the reed switch. This increase in current will produce sufficient magnetomotive force in the winding 62 to overcome the magnetomotive force in the opposite direction produced by the winding 31 and this net magnetomotive force on the reeds 22 and 18 will be of sufficient magnitude to close them thereby energizing the warning lamp 23 from the source of electrical energy through the closed reeds 18 and 22, the lead 24 and the resistor 25.

The reed switch 21 will also close to energize the warning lamp 23 should any of the other lamps 48, 51, 54, 57 and 58 be open-circuited for various reasons including the open-circuiting of the filaments contained in these lamps. The operation of each of the individual circuits connected to any of these lamps is the same as that described above in connection with tail lamp 36.

The circuit components and the currents flowing through them are selected so that one or more of these circuits may be operated either individually or simultaneously and so that if any one of the lamps to be energized is open-circuited the net magnetomotive force on the reeds 18 and 22, as the result of increased current flow through the winding 62, will close these reeds. If, however, these lamps are all operating properly when energized either singly or in combination, the magnetomotive force produced by the winding 31 and the winding 62 will be balanced such that the net magnetomotive force applied to the reeds 18 and 22 is insufficient to close them.

If the warning lamp 23 is energized when any of the switches operating the various lamps shown are actuated, the vehicle operator may then inspect the exterior of the vehicle with these switches in the energized position to determine which of the lamps located on the exterior of the vehicle are open-circuited and are not energized. He may then repair the difficulty, usually by the replacement of one of these individual lamps. The circuit will then return to its normal operating condition in which the magnetomotive force produced by the windings 31 and 62 as a result of current flow through them is insufficient to close the reeds 18 and 22 and energize the warning lamp 23.

The diodes 67, 73, 77, 83 and 87 are placed in the circuit to isolate the resistors 66, 71, 75, 81 and 85 from the winding 62 so that if a large number of circuits are employed the operation of the circuit will be more reliable and will not tend to give false indications. The number of diodes that are employed can be reduced by placing a single diode in the position shown in the circuit diagram of FIGURE 2. In this figure a single diode 91 is positioned in series with the lead 64 and the winding 62 of the reed relay 21.

It can also be appreciated by examining the operation of the circuit of FIGURE 1 that if either of the turn signal lamps 48 or 51, or the stop lamp 54 is open-circuited, that the warning lamp 23 will be flashed on and off as the bimetal switch 41 that operates the turn signal lamps 48 and 51 or the push button switch 55 that operates the brake lamp 54 is intermittently opened and closed. This may not give sufficient warning to the driver of the automotive vehicle that one of these lamps is open-circuited.

The operation of the circuit may be altered, therefore, to provide a continuous operation of the warning lamp 23 when one of these lamps, that is, the turn signal lamp 48, the turn signal 51 or the brake lamp 54 is open-circuited. This is accomplished as shown in the partial circuit diagram of FIGURE 2 (which is the same as the circuit of FIGURE 1 to the right of the dashed line) by connecting the warning lamp 23 to the lead 64 and hence to the winding 62 of the reed switch 21 through a lead 93, a normally closed switch 94, and a lead 95. Therefore, when any one of lamps 36, 48, 51, 54 or 57 is open-circuited, the current flow through its associated resistor and lead and then through the winding 62 will close the reeds 18 and 22 as explained in the discussion of FIGURE 1. This closing of the reeds will, therefore, energize the warning lamp 23 through the lead 24, resistor 25, the filament of the warning lamp 23, lead 93, normally closed switch 94, lead 95, lead 64 and the winding 62 of the reed switch and the lead 63. This provides a locking feature for locking the reeds 18 and 22 in the closed position and providing for continuous energization of the warning lamp 23 when any of the intermittently energized lamps, such as the turn signal lamps 48 and 51 or the brake lamp 54, is intermittently energized or when the other lamps, such as the tail lamp 36 and the head lamps 57 and 58, are open-circuited. This is, of course, accomplished by the current flow through the winding 62 from the lamp 23 and the circuit parameters are selected so that this current alone is sufficient to keep the reeds closed. The normally closed switch 94 may be opened by the vehicle operator to de-energize the warning lamp at his convenience prior to the repair of the open-circuited circuit.

The present invention thus provides a reliable warning lamp circuit that employs a single warning lamp for indicating to the driver of an automotive vehicle that any one of a plurality of circuits to be monitored, for example, circuits connected to exterior lamps positioned on the automotive vehicle, are open-circuited. This, of course, includes the giving of a warning by a single lamp when the most frequently encountered trouble in these circuits is present, that is, the burning out of the filament of a lamp positioned on the exterior of the vehicle such as a head lamp, a tail lamp, a turn signal lamp and a brake warning lamp.

I claim:

1. In an automotive vehicle, a plurality of electrical lamp circuits to be monitored, a source of electrical energy, means coupling said source of electrical energy and said plurality of electrical circuits, a differential reed relay including a first winding and second winding and a pair of reeds, a warning lamp coupled to said source of electrical energy through said reeds whereby said warning lamp is energized when said reeds are closed, said first mentioned means including said first winding, and means for returning a portion of the electrical energy supplied to said plurality of electrical circuits to be monitored to said source through said second winding, said second mentioned means including means for causing an unbalance in the magnetomotive force supplied by said first winding and said second winding of said reed relay when any one of said plurality of electrical circuits becomes inoperative whereby said pair of reeds will close and said warning lamp will be energized.

2. The combination of claim 1 in which the other terminal of said warning lamp is connected to the other terminal of said source of electrical energy through said second winding and through a normally closed switch.

3. In an automotive vehicle, a plurality of electrical lamp circuits to be monitored, a source of electrical energy, a reed switch comprising a first reed, a second reed, a first winding and a second winding, circuit means connecting said circuits to be monitored in parallel to form a circuit branch and circuit means connecting said branch in series with said source of electrical energy through said first winding, each of said electrical lamp circuits to be monitored having a parallel circuit connection through said second winding on said reed switch, said first winding and said second winding being wound such that current through said second winding produces a magnetomotive force on said reeds in a direction opposite to the direction of the magnetomotive force produced by current through said first winding, each of said parallel circuit connections having a resistance positioned therein, the resistance and the number of turns of said second winding being selected to produce a magnetomotive force substantially equal to the magnetomotive force of current flow through said first winding when said electrical lamp circuits to be monitored are operating properly, and to produce a magnetomotive force sufficient to close said reeds when any of said circuits to be monitored are open-circuited as a result of increased current flow through said parallel circuit connection and said second winding when any of said circuits to be monitored are open-circuited, a warning lamp connected to one of said reeds and said source of electrical energy connected to the other of said reeds whereby said warning lamp will be energized when any of said electrical lamp circuits to be monitored is open-circuited.

4. In an automotive lighting circuit, a source of electrical energy, a reed switch having a first reed and a second reed adapted to close and complete an electrical circuit through said reeds upon the application of a predetermined net magnetomotive force, said source of electrical energy connected to said first reed, a warning lamp connected to said second reed, a first winding wound about said first and second reeds and connected to one terminal of said source of electrical energy, a plurality of electrical lamp circuits connected in parallel to form a circuit branch, said branch being connected in series with said first winding, a second winding positioned around said first and said second reeds, a circuit connected in parallel with each of said electrical lamp circuits, each of said last mentioned circuits connected in series with said second winding, each of said last mentioned circuits having a resistance position therein that is larger than the resistance of each of said electrical lamp circuits whereby the current flow through said second winding is substantially less than the current flow through said first winding when said electrical lamp circuits are properly functioning, said second winding having a greater number of turns than said first winding whereby should any of the electrical lamp circuits become open-circuited the current flow through said second winding will increase to the point where the net magnetomotive force on said reeds is sufficient to close said reeds and energize said warning lamp.

References Cited
UNITED STATES PATENTS 2,844,814  7/1958  Partl _____ 340—75 X
3,171,096  2/1965  Murray et al. _____ 340—69

JOHN W. CALDWELL, Primary Examiner

KENNETH N. LEIMER, Assistant Examiner

U.S. Cl. X.R.

340—67, 80